Patented July 12, 1949

2,476,168

UNITED STATES PATENT OFFICE 2,476,168

RUBBERLIKE REACTION PRODUCT OF POLYSULFIDE WITH CHLORINATED PETROLEUM WAX

Ralph V. White, Pitman, N. J., and Harry L. Coonradt, Camp Lee, Va., assignors to Socony-Vacuum Oil Company, Incorporated, a corporation of New York No Drawing. Application July 24, 1942, Serial No. 452,208

10 Claims. (Cl. 260—79.1)

This invention relates to a new composition of matter formed by reacting alkaline polysulfides with aliphatic hydrocarbons of at least 5 carbon atoms and substituted by more than two negative groups capable of being split off in the reaction in the presence of an organic solvent. More specifically, the invention is concerned with compositions of matter having properties similar to those of rubber in its various forms.

The new compositions are referred to herein as "rubber-like," and the term is employed to designate materials having properties similar to those of various forms of natural rubber. Thus, the invention includes products similar to sticky rubber adhesives and hard resilient resins resembling ebonite in physical properties, as well as the preferred type of composition resembling the more common forms of rubber exhibiting pronounced elasticity. It is at once apparent that the reaction employed according to this invention bears a resemblance in some aspects to the well-known Thiokol reaction between a polysulfide and a dichlorinated aliphatic, such as $\beta\beta'$ dichlorodiethyl ether, ethylene dichloride, dichloroformal and the like. A critical comparison of the present reactions and products with corresponding aspects of Thiokols will be made as the discussion of the invention develops in order that those skilled in the art may be apprised of important distinctions. Reasoning by analogy from the Thiokol reaction in adapting the present invention to a specific problem often results in a divergence from a desired trend; for example, in a reaction of the present type, higher polysulfides (higher ratio of sulfur to alkali in this reactant) yield harder products. This is in direct contrast with the trend toward softer products when higher polysulfides are used in the Thiokol reaction.

In some respects, the present compositions resemble Thiokols. Both types have high resistance to solvents and chemical reagents. A very notable difference is the absence of odor in the products of this invention; whereas the Thiokols have a penetrating disagreeable odor. The much lower permanent set (permanent deformation after application of full load) of the present products as compared to Thiokols is a definite advantage from a mechanical standpoint.

On the basis of chemical structure there are undoubtedly differences. The Thiokols are assumed to have a linear structure in the nature of a chain. It is extremly unlikely that any other type of structure could result from treatment of dichlorides with polysulfides. The molecular structure of the present products appears to be in three dimensions. It has been assumed that the chain structure was essential to elasticity and that assumption may be well founded in the case of lower aliphatics. Aliphatics of less than five carbon atoms and carrying more than two chlorine substituents produce unsuitable products as will be shown below. Similarly, di-substituted higher aliphatics yield gelatinous compositions when reacted with polysulfides.

The present reaction may be conducted over a wide range of temperatures, the time of reaction varying inversely with the temperature. Various substituted aliphatics, both pure compounds and complex mixtures may be used, preference being had for petroleum hydrocarbons in the nature of paraffin wax—say, predominantly straight-chain hydrocarbons of at least 20 carbon atoms. The waxes used in examples herein contain small amounts of lighter hydrocarbons, possibly some having as few as 15 carbon atoms, but the waxes are predominantly compounds of 20 or more carbon atoms. Valuable products may also be obtained from substituted slack wax, Stoddard solvent and other hydrocarbons as low as pentanes. Branched-chain hydrocarbons are suitable, although the predominantly straight-chain waxes are preferred.

The degree of substitution of the aliphatic material by a negative radical capable of being split off in the reaction with a polysulfide is an important factor in determination of properties of the composition. Chlorinated wax of chlorine content corresponding to dichloro derivatives yields gelatinous products. Trichlorowax gives a soft sticky material having substantial elastic properties, while more highly chlorinated waxes result in rubbery materials and resilient resins resembling ebonite. In general, a higher degree of substitution is reflected in the product by an increase in tensile strength, hardness, toughness and elasticity and a decrease in permanent set and elongation. Expressed in terms of percentage chlorine in chlorinated wax, oily gelatinous materials are obtained from chlorowax of 14 to 19% chlorine. Removal of unreacted wax and monochlorowax from these chlorinated mixtures before reaction with a polysulfide gives a product resembling a set gel. It is wax-like, but somewhat rubbery. When 25 to 30% chlorowax is used, there is obtained a soft plastic mass that is very sticky and adhesive, and possessed of elastic properties. Forty per cent chlorowax (about 6 chlorine atoms per molecule) yields an elastic polymer possessing fair tensile strength, good elongation, low permanent set and fair toughness. The polymers produced from 50% chlorowax exhibit greater toughness and tensile strength. These materials are elastic and have low permanent set, but only fair elongation and they are somewhat brittle at room temperature. At 55% chlorine, the product becomes so hard it may be ground in a mortar. It may be molded into ebonite-like resins possessing good elasticity, toughness and hardness. Similar considerations apply to lower molecular weight aliphatics. Where the properties of elasticity, elongation and the like (similar to rubber in its usual forms) are desired, substitutions to the extent of about 6 substituent radicals per molecule is preferred.

Unlike the typical Thiokol reaction, the presence of a solvent is essential to the present process. Although the function of the solvent has not been definitely established, it has been found that the only operative liquids are those having the power to dissolve both reactants to at least some extent. Further, the effectiveness of the solvent appears to be related to its solvent power for the reactants. It seems reasonable to assume that the reaction proceeds only in a homogeneous phase including both reactants. For the most part, the solvents are mutually soluble with water to some extent and are used in combination with water. Preferably, the solvent employed is only partially soluble in water because organic liquids which are mutually soluble with water in all proportions usually must be used in high concentrations to achieve best results, thus increasing the cost of the operation itself and requiring careful recovery of the solvent in relatively pure state to fit it for reuse.

Referring to specific solvents, experimental runs using solvents, such as Stoddard solvent, as well as those using toluene, glycerol and carbon disulfide, gave substantially the same result as those in which no solvent was present. Unreacted chloroparaffins were recovered, no appreciable formation of polymer was found and in many cases yellow crystals, which appear to be elementary sulfur, were present. Aliphatic alcohols of lower molecular weight which satisfy the general requirements noted above are of value in the process. Glycerol does not dissolve the chloro aliphatics and is ineffective. Methyl and ethyl alcohols must be used in high concentrations, to obtain fair results, but butyl alcohol is very effective when diluted with seven times its volume of water. The product obtained with such dilute butanol is, in general, better than that resulting from reaction in 77% ethanol. Similarly, acetone is regarded as being of little practical value at low concentrations and dioxane of real worth only at concentrations of 65 to 70%; while methyl-n-amyl ketone is very effective at concentrations in the neighborhood of 30% and up. Preference is had for water soluble monohydroxy alcohols of 3 to 5 carbon atoms and water soluble ketones of 3 to 7 carbon atoms. Of these, fusel oil and butanols are particularly desirable solvents.

The amount of solvent, solvent-water ratio, temperature and time of reaction are inter-related variables which appear to be mutually dependent in the manner indicated by the tentative theory given above based on solubility of the reactants in the solvent.

The products vary somewhat with the alkaline polysulfide employed. That term is used here with its usual meaning in the art as designating a binary compound of sulfur and a positive alkaline radical, such as ammonium, an alkali metal, or an alkaline earth metal; wherein the proportion of sulfur is greater than that necessary to satisfy the normal valence of the alkaline radical. The properties of compositions formed by the use of alkali metal polysulfides are better than those obtained from reactions with polysulfides of ammonia and the alkaline earth metals such as calcium. Sodium polysulfides have proven to be the most satisfactory.

As a general rule, the tri- and tetra-sulfides form compositions having more satisfactory properties than do the other polysulfides. The products from disulfides are of inferior properties for the present purpose and it is desirable that polysulfides of greater sulfur content than the disulfide be used. Products from reaction with pentasulfides and higher possess less tensile strength than do those from tri- and tetra-sulfides. Since the sulfur content of a polysulfide may be expressed statistically as a number other than a whole number in many cases, the preferred polysulfides may be designated as $$M_2S_{(2 \text{ to } 5)v}$$

where M is a metal and $v$ is the valence thereof. For example, $Na_2S_{3.5}$.

For the most part, the present compositions usually contain about 10% to 20% chlorine and about 20% to 30% sulfur. They are charred by flames but will not burn in air, as do the Thiokols, and they have a lower resistance to attack by aromatic hydrocarbons, although in this respect they are markedly superior to natural rubber. Copolymerization of polychlorinated wax and ethylene dichloride gives interesting results. The combined product partakes of the valuable properties of both types of compositions (those of the present invention and those of Thiokols) to an extent which is unexpected, while the inferior properties of each are minimized. Flame resistance, resistance to aromatic solvents, permanent set and elasticity are properties in which marked improvement is found with respect to that type of composition which is inferior.

The present products are capable of improvement by heat treatments similar to vulcanization, and may, therefore, be blended with natural rubber and/or other synthetic compositions of rubber-like properties.

The nature of the invention may be further understood by reference to the following specific examples showing the nature of products obtained by various procedures.

Although emulsifying agents are not effective to replace the organic solvent, the use of such materials is within the scope of the invention in order to prepare dispersions similar to latex. The organic solvent must, of course, be present in the reaction mixture, but such dispersing agents as carbohydrates, alkylated carbohydrates, crude proteins, basic hydroxides, petroleum sulfonates and the like may also be present to facilitate dispersion of the product as formed.

In the exemplary procedures described below, except where other conditions are specified, the reactions were carried out in a glass flask equipped with a stirrer and reflux condenser, the flask being immersed in a heated oil bath. These reactions were accompanied by gentle refluxing and the temperature, therefore, varied with the boiling characteristics of the solvent. Usual temperatures under these conditions were around 100° C., but where lower boiling solvents were used, the temperatures were correspondingly lower. Due to the viscous and plastic nature of the several products, efficient stirring could not always be maintained during the full course of some reactions. An excess of alkaline polysulfide was present throughout each reaction.

The reaction products obtained are insoluble in the reaction medium and are readily separated. The product in each case was washed several times with hot water to remove water soluble inorganic material and organic solvent. Where the physical properties of the product permitted, it was washed with hot water and rolled on a rubber mill.

Example I

Twenty-five grams of chlorinated petroleum wax of 41% chlorine content was reacted with 87 grams (0.5 mol) of sodium tetra-sulfide in 381 cc. of water and 50 cc. of normal butanol for 26 hours. The product was 23 grams of a dark brown elastic solid of low permanent set. It was fairly tough and exhibited elongation of several hundred per cent.

Example II

Thirty grams of 41% chlorowax reacted with 87 grams of sodium tetra-sulfide in 231 cc. of water, 100 cc. of n-butanol and 50 cc. of secondary butanol for 20 hours yielded 27 grams of a product lighter in color than that of Example I, and having less elasticity and lower elongation.

Example III

The effect of the extent of substitution is illustrated by a reaction between 50 grams of 16% chlorowax and 87 grams of sodium tetra-sulfide in 231 cc. of water and 150 cc. of secondary butanol for 36 hours. The product, 46 grams, was dark brown in color and similar in physical properties to a gel.

Example IV

When Example I was repeated without the organic solvent butanol, a red-brown oil, unsuited to the purposes of the invention, was found in the reaction mass, but no rubber-like product was obtained.

Example V

Reacting 78 grams of sodium pentasulfide with 25 grams of 41% chlorowax in 310 cc. of water and 50 cc. of normal butanol for 27 hours gave 33 grams of a tan colored elastic product.

Example VI

Twenty-five grams of 41% chlorowax was reacted with 54 grams of sodium trisulfide while dissolved in 310 cc. of water and 50 cc. of normal butanol for 69 hours, 25 grams of a light brown, slightly sticky, elastic product were obtained. Upon standing, the properties of this product improved and the aged material had good elongation and considerably greater elasticity and toughness.

Example VII

Tetra-chloropentane (66% Cl) was reacted with sodium tetra-sulfide in the proportions of 25 grams alkyl halide to 66 grams of polysulfide while dissolved in 310 cc. of water and 50 cc. of n-butanol for 41 hours. Twenty-one grams of a black, fairly hard mass of low elasticity were obtained as product.

Example VIII

Ammonium tetra-sulfide (65.6 grams) was reacted with 25 grams of 41% chlorowax in 100 cc. of water and 50 cc. of n-butanol; 60 grams of product of tan color were obtained. Hydrogen sulfide was evolved during the reaction and it appeared that elementary sulfur was present in the resilient mass. Stabilization of ammonium polysulfide is desirable to avoid this contamination.

Example IX

One-hundred-fifty cc. of 91% isopropanol and 210 cc. of water were used as the medium in which 25 grams of 41% chlorowax was reacted with 66 grams of sodium tetra-sulfide for 29 hours; 28 grams of product were obtained having several hundred per cent elongation, low permanent set, fair tensile strength and good toughness. The surface of the product was slightly tacky.

Example X

Calcium pentasulfide was found to produce a fairly satisfactory product for some uses. The surface was sticky, however, and the mass had some resemblance to a soft plastic. In this run, 50 grams of the polysulfide were reacted with 25 grams of 41% chlorowax in 50 cc. of n-butanol and 200 to 250 cc. of water for 47 hours. This product would seem to be an intermediate stage, and the full reaction time with alkaline earth polysulfides is believed to be very long.

Example XI

A highly chlorinated wax gives a harder product. Twenty-five grams of 55% chlorowax were reacted with 54 grams of sodium trisulfide in 50 cc. of n-butanol and 310 cc. of water for 29 hours. The product (16 grams) was elastic, quite hard and rather brittle. The freshly prepared material had a prominent coppery sheen which faded on aging about one day.

Example XII

Lower chlorine content results in stickier products. Thirty-five grams of 30% chlorowax were reacted with 87 grams of sodium tetra-sulfide in 281 cc. of water and 50 cc. of n-butanol for 24 hours; 30 grams of a sticky, elastic mass were obtained.

Example XIII

Sixty-five grams of 52.5% chlorowax were reacted with 66 grams of sodium tetra-sulfide in 310 cc. of water and 75 cc. of n-butanol for 23 hours. The product obtained was 77 grams of a tough, elastic composition having high tensile strength and fair elongation at 40° to 50° C. The material was somewhat brittle at room temperature.

Example XIV

Dioxane of approximately 60 to 70% concentration in water was used as the solvent for a reaction between 25 grams of 41% chlorowax and 44 grams of sodium tetra-sulfide. Twenty-nine grams of a spongy product were obtained. As recovered from the reaction mixture, this product is somewhat crumbly and cannot be milled on cold rolls. It is subject to modification by further treatment and/or blending with other materials to form valuable products.

Example XV

Methyl-normal-amyl ketone in the amount of 75 cc. and 180 cc. of water were used as the medium in which 25 grams of 41% chlorowax were reacted with 44 grams of sodium tetra-sulfide for 45 hours. The product was recovered as 12 grams of small pieces of somewhat spongy nature.

Example XVI

A tough elastic product of some brittleness at room temperature was obtained from the reaction of 35 grams of 50% chlorowax with 44 grams of sodium tetra-sulfide in 75 cc. of n-butanol and 200 cc. of water for 28 hours. Fifty grams of the product were recovered and it was found that it could be stretched several hundred per cent before rupture.

Example XVII

A co-polymer of the present type product in combination with a Thiokol was made by reacting 87 grams of sodium tetra-sulfide with 20 grams each of 41% chlorowax and ethylene dichloride in 75 cc. of n-butanol and 390 cc. of water for 28 hours. Fifty-five grams of product were found. This material had a mildly disagreeable odor, was elastic and fairly tough. It seemed to lose tensile strength during cold milling.

Example XVIII

Thirty-five grams of 25% chlorowax were reacted with 44 grams of sodium tetra-sulfide in 75 cc. of n-butanol and 200 cc. of water for 28 hours. The product was very sticky and somewhat elastic. There was considerable loss on the roll in milling.

Example XIX

Thirty grams of Stoddard Solvent chlorinated to 42% chlorine content were reacted with 87 grams of sodium tetra-sulfide in 100 cc. n-butanol and 280 cc. of water for 22 hours. The product was black and had a bad odor which may be due to the fact that the initial hydrocarbon (Stoddard Solvent) contained aromatics, naphthenes and the like.

Example XX

Ethyl alcohol (77%) was used as the solvent for 25 grams of 41% chlorowax and 66 grams of sodium tetra-sulfide. Twenty-seven grams of an elastic product having a gray-tan color were obtained.

Example XXI

Twenty-five grams of 41% chlorowax and 87 grams of sodium tetra-sulfide were reacted in 331 cc. of water and 50 cc. of n-butanol in an autoclave at 140° to 150° C. for 1 hour. A solid rubber-like product was obtained.

Example XXII

Seventy-two grams of a commercially available chlorinated petroleum product known as "Anglamol 40" having a molecular weight of 694 and containing 41.6% chlorine was reacted with 80 grams of sodium tetra-sulfide in 250 cc. of water and 250 cc. of ethyl alcohol in an autoclave at 160° to 175° C. for 3¼ hours. The product was a gray-black rubber-like solid in the form of small pieces.

Example XXIII

Seventy-two grams of a chlorinated oil obtained by chlorinating a water-white mineral oil fraction boiling between 374° and 530° F. to 49.7% chlorine was reacted with 80 grams of sodium tetra-sulfide in 250 cc. of water and 250 cc. of ethyl alcohol in an autoclave with stirring at 160° to 170° C. The total elapsed time for reaction to a rubber-like product was not determined because the reaction had to be suspended at the end of 1⅓ hours due to mechanical failure of the autoclave. The appearance of the product at this time is interesting as bearing on the changes in the product as the reaction progresses. At the time the reaction was suspended, the washed product was a black, plastic solid having a softness similar to that of carpenters' putty.

The intermediate withdrawn in the run described in Example XXIII is characteristic of the observed course of the reaction at lower temperatures. There appears to be progressive condensation resulting first in a very viscous plastic material which changes over to a rubbery solid and finally takes on a crumbly nature.

We claim:

1. A composition of matter having rubber-like properties formed by reacting sodium tetra-sulfide with chlorinated petroleum wax of about 40% chlorine content in a fluid medium comprising water and normal butanol.

2. A composition of matter having rubber-like properties formed by reacting sodium tetra-sulfide with chlorinated mixed aliphatic hydrocarbons predominantly of at least 20 carbon atoms containing about 40% chlorine in a fluid medium comprising water and normal butanol.

3. A composition of matter having rubber-like properties formed by reacting sodium tetra-sulfide with chlorinated petroleum wax having about 6 chlorine atoms per molecule in a fluid medium comprising water and normal butanol.

4. A composition of matter having rubber-like properties formed by reacting sodium tri-sulfide with chlorinated petroleum wax of about 55% chlorine content in a fluid medium comprising water and normal butanol.

5. A composition of matter having rubber-like properties formed by reacting sodium tetra-sulfide with chlorinated petroleum wax of about 25% to about 30% chlorine content in a fluid medium comprising water and methyl-normal-amyl ketone.

6. A composition of matter having rubber-like properties formed by reacting a polysulfide of a radical from the group consisting of ammonium, alkali metal and alkaline earth metal with a chlorinated paraffin wax having more than two chlorine substituents per molecule, said reaction being conducted in a fluid medium comprising water and a substantial proportion of a water soluble organic liquid which is a mutual solvent for said polysulfide and said chlorinated wax.

7. A composition of matter having rubber-like properties formed by reacting a polysulfide of a radical from the group consisting of ammonium, alkali metal and alkaline earth metal with a chlorinated paraffin wax having more than two chlorine substituents per molecule, said reaction being conducted in a fluid medium comprising water and a substantial proportion of a water soluble mono-hydroxy alcohol of three to five carbon atoms which is a mutual solvent for said polysulfide and said chlorinated wax.

8. A composition of matter having rubber-like properties formed by reacting a polysulfide of a radical from the group consisting of ammonium, alkali metal and alkaline earth metal with a chlorinated paraffin wax having more than two chlorine substituents per molecule, said reaction being conducted in a fluid medium comprising water and a substantial proportion of a water soluble ketone of three to seven carbon atoms which is a mutual solvent for said polysulfide and said chlorinated wax.

9. A composition of matter having rubber-like properties formed by reacting a polysulfide of a radical from the group consisting of ammonium, alkali metal and alkaline earth metal with a chlorinated paraffin wax having more than two chlorine substituents per molecule and having about 40% chlorine content, said reaction being conducted in a fluid medium consisting of a mixture of water and normal butanol.

10. A composition of matter having rubber-like properties formed by reacting approximately 78% sodium tetra-sulfide with 22% chlorinated paraffin wax of about 40% chlorine content in a fluid medium comprising water and normal butanol.

RALPH V. WHITE.
HARRY L. COONRADT.

REFERENCES CITED

The following references are of record in the file of this patent:

UNITED STATES PATENTS

| Number | Name | Date |
|---|---|---|
| 1,923,392 | Patrick | Aug. 22, 1933 |
| 1,962,460 | Patrick | June 12, 1934 |
| 2,050,370 | Orthner et al. | Aug. 11, 1936 |
| 2,050,583 | Orthner et al. | Aug. 11, 1936 |
| 2,056,026 | Twiss et al. | Sept. 29, 1936 |
| 2,067,465 | Horst | Jan. 12, 1936 |
| 2,186,916 | Gaylor | Jan. 9, 1940 |
| 2,278,368 | Frost et al. | Mar. 31, 1942 |
| 2,341,453 | Lieber et al. | Feb. 8, 1944 |